(12) United States Patent
Takizawa

(10) Patent No.: US 8,299,682 B2
(45) Date of Patent: Oct. 30, 2012

(54) ULTRASONIC MOTOR

(75) Inventor: Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 54 days.

(21) Appl. No.: 13/049,161

(22) Filed: Mar. 16, 2011

(65) Prior Publication Data

US 2011/0234049 A1    Sep. 29, 2011

(30) Foreign Application Priority Data

Mar. 23, 2010   (JP) ................................. 2010-065790

(51) Int. Cl.
*H01L 41/08* (2006.01)

(52) U.S. Cl. ......... 310/323.02; 310/323.12; 310/323.16; 310/333

(58) Field of Classification Search ............. 310/323.02, 310/323.12, 323.16, 333
See application file for complete search history.

(56) References Cited

U.S. PATENT DOCUMENTS

| | | | | |
|---|---|---|---|---|
| 4,812,697 A | * | 3/1989 | Mishiro | 310/323.12 |
| 4,965,482 A | * | 10/1990 | Ohnishi et al. | 310/323.13 |
| 5,051,647 A | * | 9/1991 | Uchikawa et al. | 310/323.12 |
| 5,306,980 A | * | 4/1994 | Montgomery | 310/333 |
| 5,319,278 A | * | 6/1994 | Myohga et al. | 310/323.12 |
| 5,723,935 A | * | 3/1998 | Tomikawa et al. | 310/323.02 |
| 6,252,332 B1 | * | 6/2001 | Takagi et al. | 310/323.02 |
| 6,469,419 B2 | * | 10/2002 | Kato et al. | 310/323.02 |
| 2010/0019621 A1 | * | 1/2010 | Funakubo et al. | 310/323.16 |

FOREIGN PATENT DOCUMENTS

JP        09-117168        5/1997

* cited by examiner

*Primary Examiner* — Mark Budd
(74) *Attorney, Agent, or Firm* — Scully, Scott, Murphy & Presser, PC

(57) ABSTRACT

In an ultrasonic motor, an elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting of a rotation axis, and the dimension ratio of the rectangle of the vibrator is chosen such that a resonance frequency of the longitudinal primary resonance vibration, resulting from the expansion and the contraction of the vibrator in the direction of the central axis and a resonance frequency of the torsional secondary resonance vibration or the torsional tertiary resonance vibration resulting from twisting of the rotation axis match. The vibrator includes a torsional piezoelectric body that generates a thickness shear vibration, and that is arranged at an anti-node position of the torsional secondary resonance vibration or the torsional tertiary resonance vibration.

12 Claims, 19 Drawing Sheets

FIG.6A                    FIG.6B
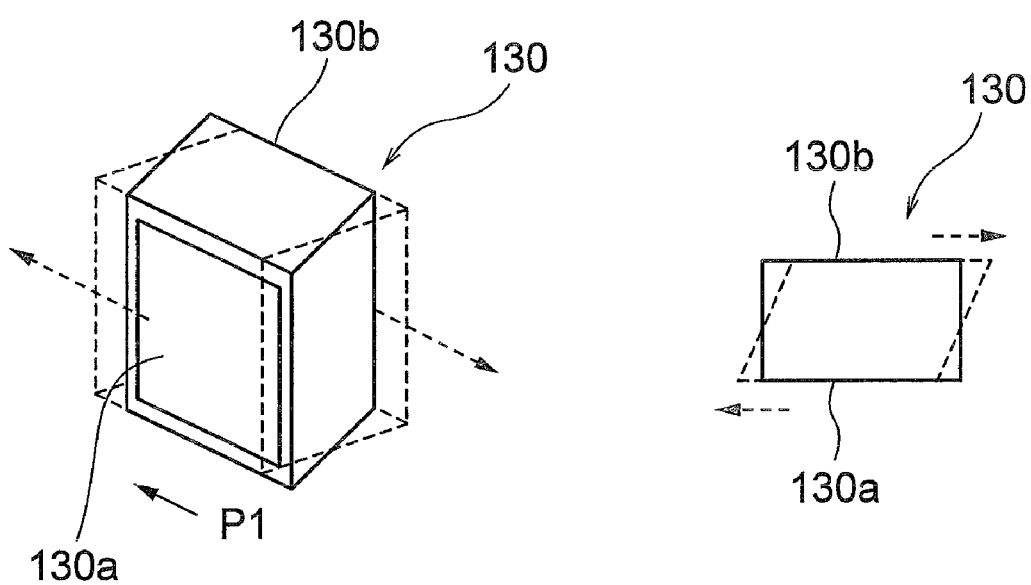

FIG.9A
FIG.9B
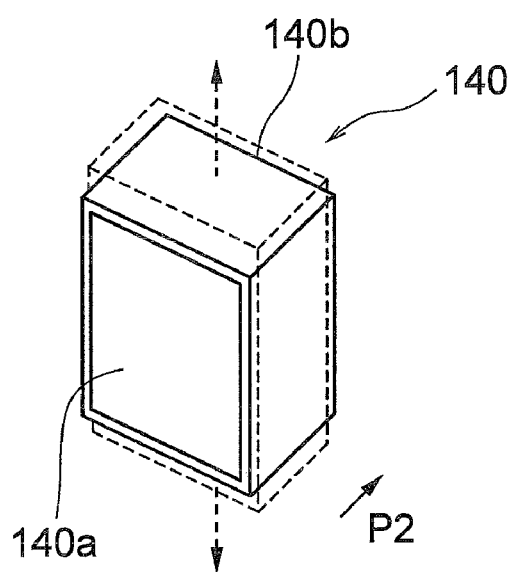
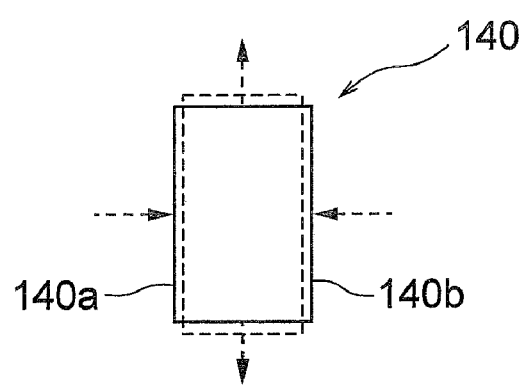

ULTRASONIC MOTOR

CROSS-REFERENCE TO RELATED APPLICATION

The present application is based upon and claims the benefit of priority from the prior Japanese Patent Application No. 2010-065790 filed on Mar. 23, 2010; the entire contents of which are incorporated herein by reference.

BACKGROUND OF THE INVENTION

1. Field of the Invention

The present invention relates to ultrasonic motors.

2. Description of the Related Art

Japanese Patent Application Laid-open No. H9-117168, for example, discloses an ultrasonic motor that generates an elliptical vibration by combining a longitudinal vibration and a torsional vibration, and rotation drives a rotor. FIG. 1 of Japanese Patent Application Laid-open No. H9-117168 depicts an exploded perspective view of a vibrator. The vibrator has a structure in which a plurality of piezoelectric elements is arranged between elastic bodies that are cut obliquely with respect to an axis of the vibrator. Positive electrodes of the piezoelectric elements are divided into two groups. These groups will be called Phase A and Phase B electrodes.

The longitudinal vibration can be generated in a bar-shaped vibrator by applying alternating voltages of the same phase to both Phase A and Phase B electrodes. On the other hand, the torsional vibration can be generated in the bar-shaped vibrator by applying alternating voltages of opposite phases to both Phase A and Phase B electrodes. A position of a groove in the vibrator is adjusted such that a resonance frequency of the longitudinal vibration and a resonance frequency of the torsional vibration substantially match. When alternating voltages that differ by Π/2 phase are applied to Phase A and Phase B electrodes, the longitudinal vibration and the torsional vibration are generated simultaneously, thereby generating an elliptical vibration on a top surface of a bar-shaped elastic body. In this state, by pressing the rotor on the top surface of the bar-shaped elastic body, the rotor can be rotated in a clockwise direction (CW direction) or a counter-clockwise direction (CCW direction).

The ultrasonic motor disclosed in Japanese Patent Application Laid-open No. H9-117168 has various drawbacks. For example, as shown in FIG. 1, both the piezoelectric element and the elastic body are necessary, the elastic body must be cut obliquely, and the groove must be made in a portion of the elastic body to match the resonance frequencies of the longitudinal vibration and the torsional vibration. Thus, in the ultrasonic motor, the overall structure of the conventional vibrator is very complicated and an efficiency of generation of a torsional resonance vibration is low.

SUMMARY OF THE INVENTION

The present invention is made in view of the above discussion, and it is an object of the present invention to provide an ultrasonic motor that can generate a torsional resonance vibration efficiently by positively applying a bending movement of a piezoelectric element. Moreover, the ultrasonic motor according to the present invention consists of a single part, has a simple structure without a groove etc., can generate a longitudinal vibration and a torsional vibration easily, can generate an elliptical vibration by combining the longitudinal vibration and the torsional vibration, and can rotate a rotor by the elliptical vibration.

To solve the above problems and to achieve the above objects, according to an aspect of the present invention, an ultrasonic motor includes a vibrator having a dimension ratio of a rectangle in a cross-section orthogonal to a central axis; and a rotor that contacts an elliptical vibration generating surface of the vibrator and that is rotated around the central axis that is orthogonal to the elliptical vibration generating surface of the vibrator. An elliptical vibration is generated by combining a longitudinal primary resonance vibration, resulting from an expansion and a contraction of the vibrator in a direction of the central axis, and a torsional secondary resonance vibration or a torsional tertiary resonance vibration, resulting from twisting of a rotation axis. The dimension ratio of the rectangle of the vibrator is chosen such that a resonance frequency of the longitudinal primary resonance vibration and a resonance frequency of the torsional secondary resonance vibration or the torsional tertiary resonance vibration match. The vibrator includes a torsional piezoelectric body that generates a thickness shear vibration, and that is arranged at an anti-node position of the torsional secondary resonance vibration or the torsional tertiary resonance vibration.

In the ultrasonic motor according to the present invention, it is preferable that a polarization direction of the torsional piezoelectric body be orthogonal to the rotation axis of the rotor and an application direction towards driving electrodes.

In the ultrasonic motor according to the present invention, it is preferable that the driving electrodes of the torsional piezoelectric body be provided on side faces of the vibrator.

In the ultrasonic motor according to the present invention, it is preferable that two torsional piezoelectric bodies be arranged at two anti-node positions of the torsional tertiary resonance vibration.

In the ultrasonic motor according to the present invention, it is preferable that one torsional piezoelectric body be arranged at one of the two anti-node positions of the torsional tertiary resonance vibration.

In the ultrasonic motor according to the present invention, it is preferable that one torsional piezoelectric body be arranged at one anti-node position of the torsional secondary resonance vibration.

BRIEF DESCRIPTION OF THE DRAWINGS

FIG. 6A is a perspective view depicting a thickness shear vibration when a drive signal is applied to the piezoelectric element for torsional vibration according to the first embodiment, and FIG. 6B is a plan view of FIG. 6A;

FIG. 9A is a perspective view, from an upper front right side, depicting a vibration when the drive signal is applied to the piezoelectric element for longitudinal vibration according to the first embodiment, and FIG. 9B is a right side view of FIG. 9A;

DETAILED DESCRIPTION OF THE INVENTION

Exemplary embodiments of an ultrasonic motor according to the present invention are explained in detail below referring to the accompanying drawings. The present invention is not limited to the following embodiments.

First Embodiment

Figure 1:
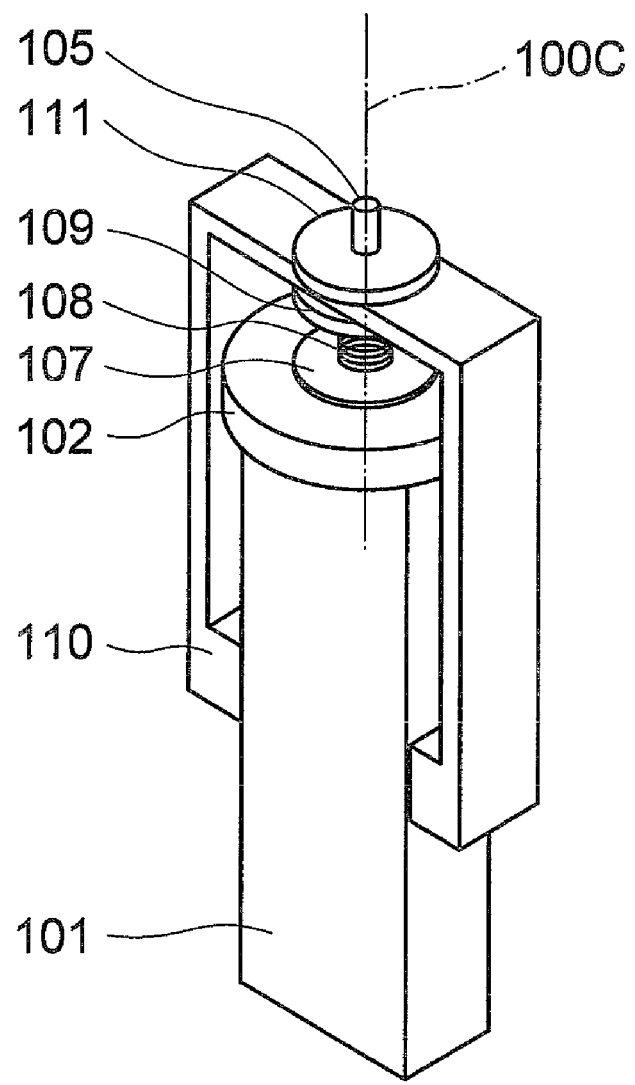
FIG. 1 is a perspective view of a structure of an ultrasonic motor according to a first embodiment of the present invention.
Figure 2:
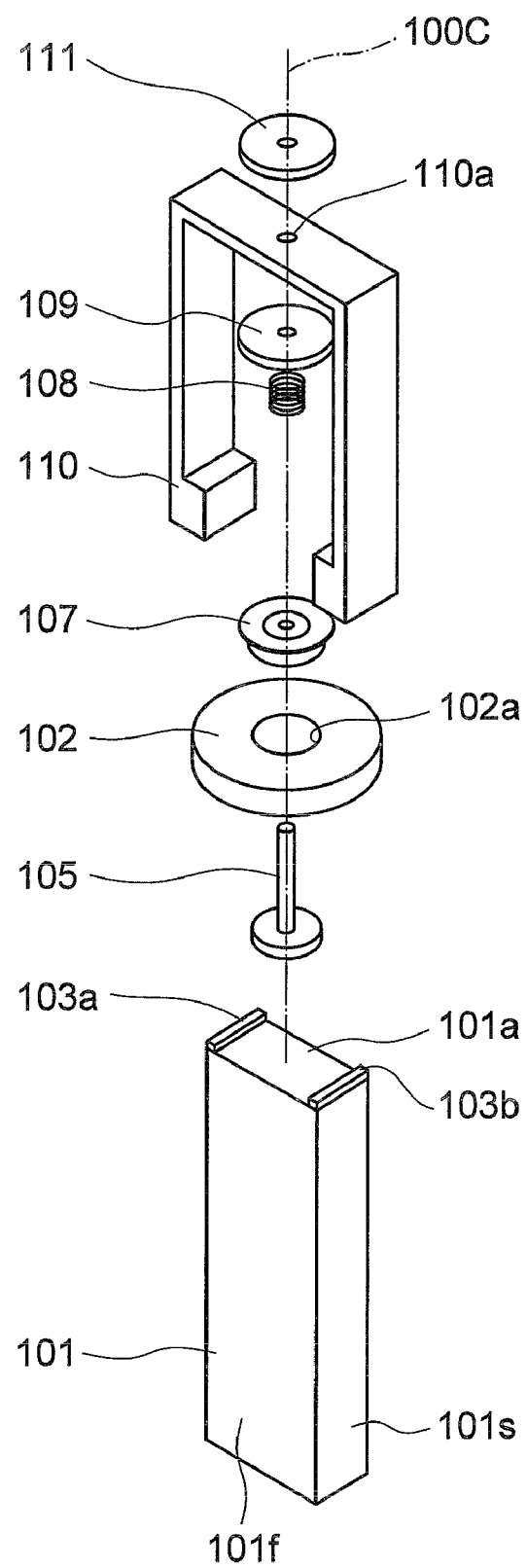
FIG. 2 is an exploded perspective view of the structure of the ultrasonic motor according to the first embodiment of the present invention.

An ultrasonic motor 100 according to the first embodiment of the present invention generates an elliptical vibration by combining a longitudinal primary resonance vibration and a torsional secondary resonance vibration. As shown in FIGS. 1 and 2, the ultrasonic motor 100 includes a vibrator 101 and a rotor 102.

The vibrator 101 is a piezoelectric element of a substantially right-angled parallelepiped shape having a dimension ratio of a rectangle in a cross-section orthogonal to its central axis 100c (rotation axis). The rotor 102 is substantially disk-shaped. A bottom surface of the rotor 102 contacts with friction contact members 103a and 103b that are arranged on an elliptical vibration generating surface 101a of the vibrator 101. The rotor 102 is rotated around the central axis 100c that is orthogonal to the elliptical vibration generating surface 101a of the vibrator 101.

A structure for coupling the rotor 102 to the vibrator 101 is explained below.

A holder 110 is fixed near a node of the vibrator 101 (piezoelectric element). A shaft 105, the rotor 102, a bearing 107, a spring 108, and a cap ring 109 are arranged in this order between the elliptical vibration generating surface 101a of the vibrator 101 and the holder 110. All these members are concentrically arranged on the central axis 100c.

The bearing 107 is engaged with a central hole 102a of the rotor 102. The shaft 105 passes through the central hole of the rotor 102 and a hole of the bearing 107 along the central axis 100c. A base of the shaft 105 rests on the elliptical vibration generating surface 101a of the vibrator 101.

The shaft 105, which penetrates the central hole 102a of the rotor 102 and the hole of the bearing 107, passes through the spring 108 and a hole of the cap ring 109 in this order, and then passes through a through hole 110a provided in an upper part of the holder 110. A ring 111 is threadably mounted on an upper tip of the shaft 105 that comes out of the through hole 110a. The shaft 105 is thus fixed to the holder 110.

The cap ring 109 and the shaft 105 are provided with threads, and the cap ring 109 is threadably mounted on the shaft 105. A position of the cap ring 109 on the shaft 105, i.e., a pressing force of the spring 108, can be adjusted by rotating the cap ring 109. In other words, a force by which the rotor 102 presses the friction contact members 103a and 103b can be adjusted by rotating the cap ring 109.

How resonance frequencies are matched in the vibrator 101 (piezoelectric element) included in the ultrasonic motor 100 is explained below referring to FIGS. 3A to 3E and FIG. 4.

Figure 3A:
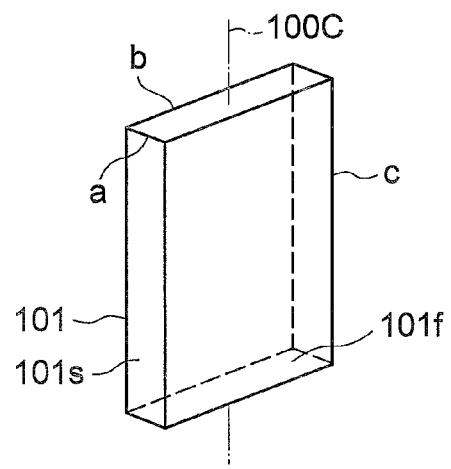
FIG. 3A is a perspective view of a schematic structure of a vibrator according to the first embodiment.
Figure 3B:
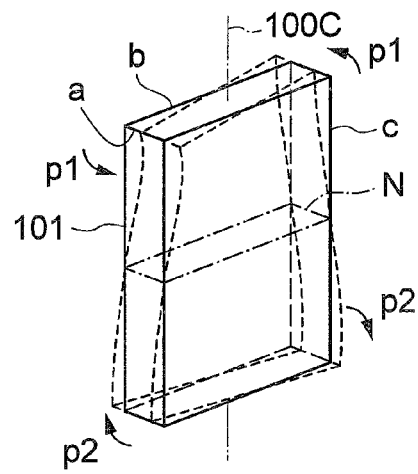
FIG. 3B is a perspective view that depicts with a dotted line a vibration state of the vibrator in a torsional primary vibration mode.

As shown in FIG. 3A, the vibrator 101 has a substantially right-angled parallelepiped shape. A length of a short side 101s of a rectangular cross-section that is orthogonal to the central axis 100c is denoted by a, a length of a long side 101f is denoted by b, and a height of the vibrator 101 along the central axis 100c is denoted by c. In the following explanation, a height direction of the vibrator 101 is assumed to be a direction of vibrations in a primary vibration mode as well as an axis direction of torsion in the torsional vibration. Moreover, a, b, and c satisfy a<b<c.

The resonance frequency in the longitudinal primary vibration mode and the resonance frequency in a torsional secondary vibration mode, or the resonance frequency in the longitudinal primary vibration mode and the resonance frequency in a torsional tertiary vibration mode can be matched by appropriately choosing a, b, and c in the vibrator 101.

Figure 3C:
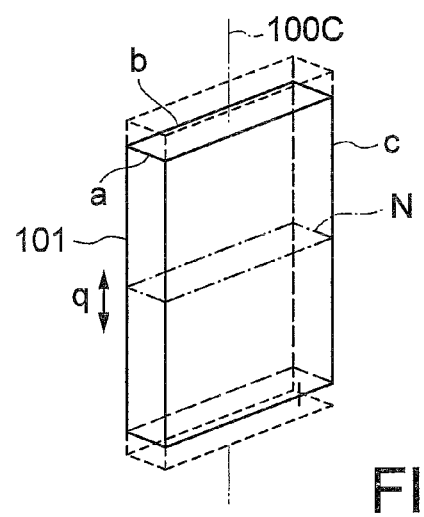
FIG. 3C is a perspective view that depicts with a dotted line a vibration state of the vibrator in a longitudinal primary vibration mode.
Figure 3D:
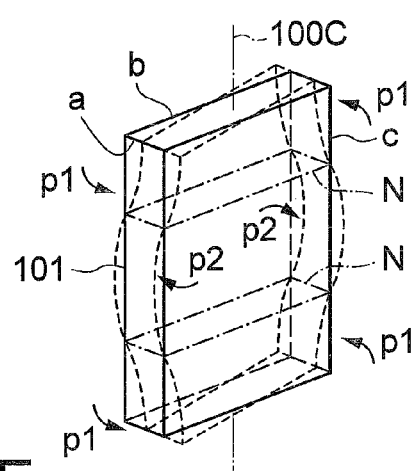
FIG. 3D is a perspective view that depicts with a dotted line a vibration state of the vibrator in a torsional secondary vibration mode.
Figure 3E:
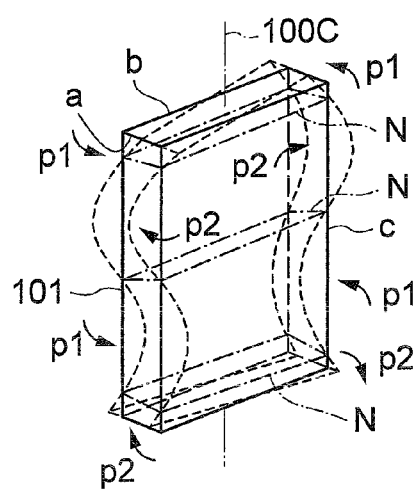
FIG. 3E is a perspective view that depicts with a dotted line a vibration state of the vibrator in a torsional tertiary vibration mode.

In FIGS. 3B to 3E, directions of the torsional vibration are shown by p1 and p2, a direction of the longitudinal vibration is shown by q, and a node of the vibrations is shown by N. One node N is present at central positions in a height direction in each of a torsional primary vibration mode (FIG. 3B) and the longitudinal primary vibration mode (FIG. 3C). Two nodes N are present at two positions in the height direction in the torsional secondary vibration mode (FIG. 3D). Three nodes N are present at three positions in the height direction in the torsional tertiary vibration mode (FIG. 3E).

In FIGS. 3B to 3E, a continuous line is used to show a shape of the vibrator 101 before it is subjected to vibrations and a dotted line is used to show a shape of the vibrator 101 after it is subjected to vibrations.

Figure 4:
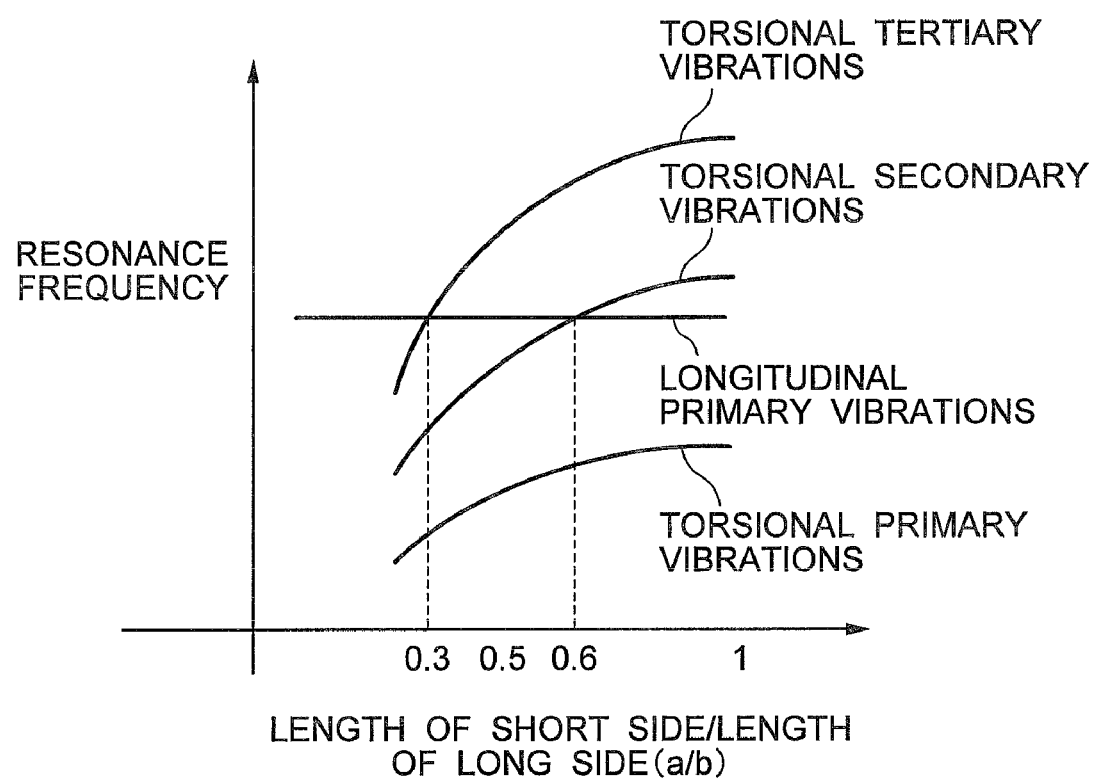
FIG. 4 is a graph that depicts resonance frequencies of each of the modes when a height of the vibrator is fixed and a parameter represented by a length of a short side/a length of a long side is plotted on an axis of abscissa.

As can be seen in FIG. 4, when the parameter a/b is varied, although the resonance frequency of the longitudinal primary vibration mode stays constant without depending on the parameter a/b, the resonance frequencies of the torsional vibration increase with an increase in the parameter a/b.

Furthermore, the resonance frequency of the torsional primary vibration mode never matches with the resonance frequency of the longitudinal primary vibration mode irrespective of the value of the parameter a/b. On the contrary, the resonance frequency of the torsional secondary vibration mode matches with the resonance frequency of the longitudinal primary vibration mode near a position where the parameter a/b is near 0.6. Moreover, the resonance frequency of the torsional tertiary vibration mode matches with the resonance frequency of the longitudinal primary vibration mode near a position where the parameter a/b is near 0.3. Therefore, the lengths a and b are chosen in the vibrator 101 according to the first embodiment such that the parameter a/b falls between 0.25 and 0.35 in the longitudinal primary vibration and the torsional tertiary vibration, and falls between 0.5 and 0.6 in the longitudinal primary vibration and the torsional secondary vibration.

In the ultrasonic motor 100, the elliptical vibration is generated by combining the longitudinal primary resonance vibration, resulting from an expansion and a contraction of the vibrator 101 along the central axis 100c (rotation axis), and the torsional secondary resonance vibration or a torsional tertiary resonance vibration, resulting from twisting of the vibrator 101 around the central axis 100c. A ratio (proportion) of the lengths a and b is chosen such that the resonance frequencies of the longitudinal primary resonance vibration, resulting from the expansion and the contraction of the vibrator 101 along the central axis 100c, and the torsional secondary resonance vibration or the torsional tertiary resonance vibration, resulting from twisting of the vibrator 101 around the central axis 100c, almost match.

The vibrator 101 includes a multilayered piezoelectric element 120 (FIG. 12) having a plurality of piezoelectric elements stacked and bonded thereon. The longitudinal primary resonance vibration and the torsional tertiary resonance vibration are generated in the vibrator 101 according to a deformation of each piezoelectric element. The multilayered piezoelectric element 120 includes a first piezoelectric element 131 and a second piezoelectric element 132 that are piezoelectric elements 130 for torsional vibration, and a third piezoelectric element 141 and a fourth piezoelectric element 142 that are piezoelectric elements 140 for longitudinal vibration.

The piezoelectric elements and driving electrodes thereof are not shown in FIGS. 1 and 2.

Figure 5:
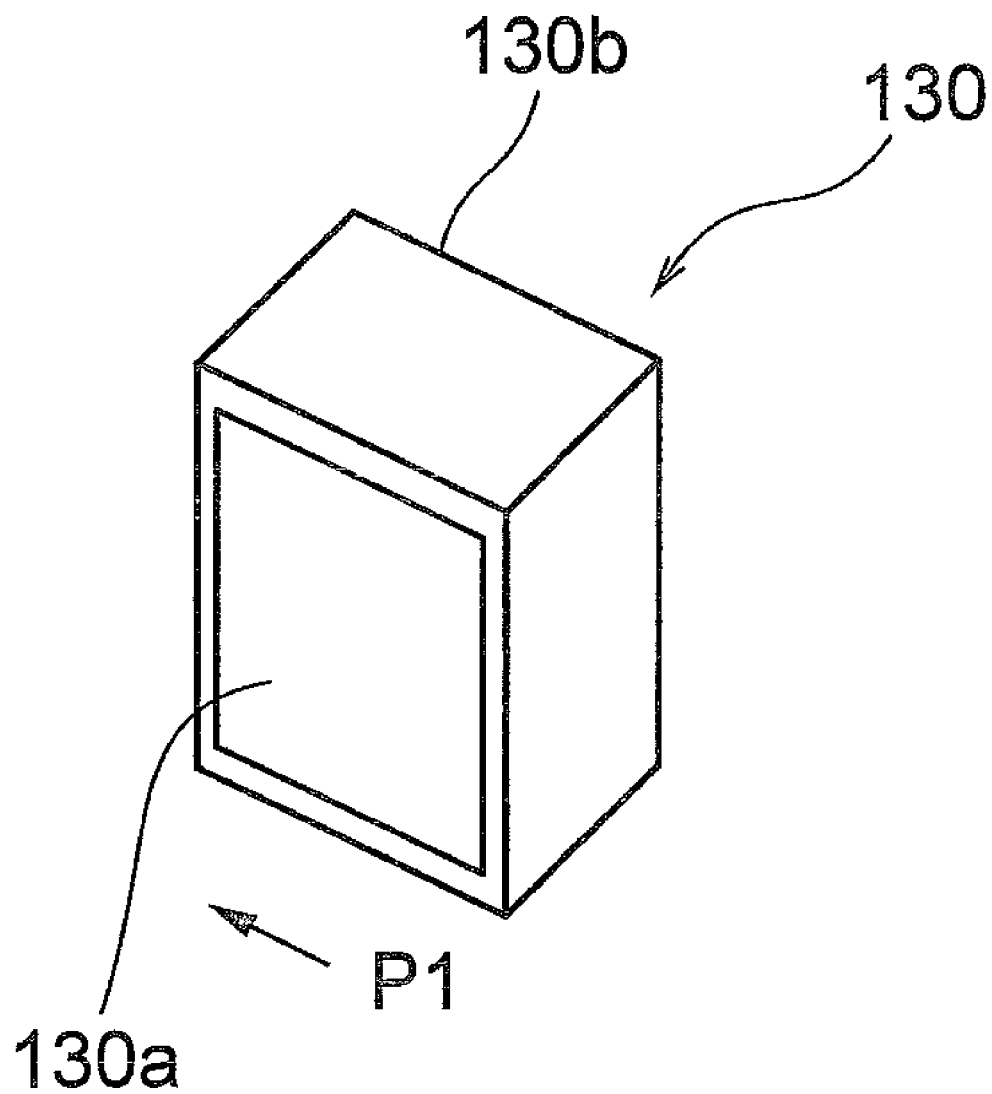
FIG. 5 is a perspective view of a structure of a piezoelectric element for torsional vibration according to the first embodiment.
Figure 7A:
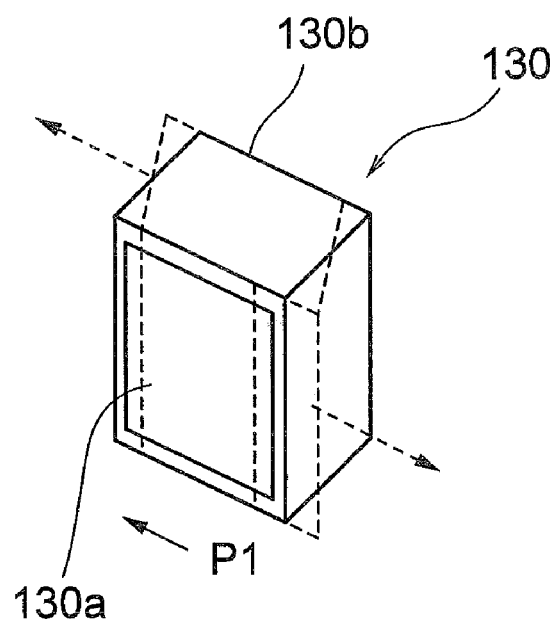
FIG. 7A is a perspective view depicting a thickness shear vibration when a drive signal in a direction opposite to the direction of the case shown in FIGS. 6A and 6B is applied to the piezoelectric element for torsional vibration according to the first embodiment.
Figure 7B:
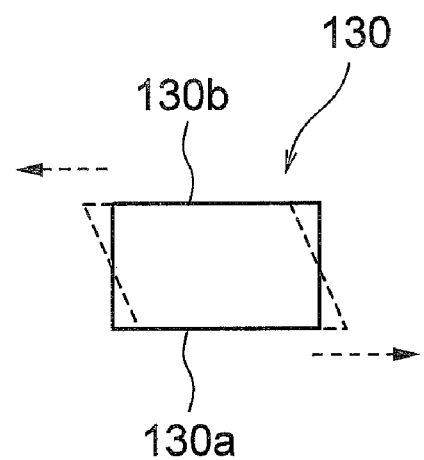
FIG. 7B is a plan view of FIG. 7A.

The piezoelectric element 130 for torsional vibration (torsional piezoelectric body) constituting the multilayered piezoelectric element 120 is explained with reference to FIGS. 5 to 7B. FIG. 5 is a perspective view, from an upper front right side, of a structure of the piezoelectric element 130 for torsional vibration. FIG. 6A is a perspective view, from an upper front right side, depicting a thickness shear vibration when a drive signal is applied to the piezoelectric element 130 for torsional vibration. FIG. 6B is a plan view of FIG. 6A. FIG. 7A is a perspective view, from an upper front right side, depicting a thickness shear vibration when a drive signal in a direction opposite to the direction of the case shown in FIGS. 6A and 6B is applied to the piezoelectric element 130 for torsional vibration. FIG. 7B is a plan view of FIG. 7A.

As shown in FIG. 5, the piezoelectric element 130 for torsional vibration is a piezoelectric body of a substantially right-angled parallelepiped shape. In the piezoelectric element 130 for torsional vibration, a first driving electrode 130a and a second driving electrode 130b are, respectively, provided on a front face and a rear face, of the piezoelectric element 130 for torsional vibration, that are facing each other. The first driving electrode 130a and the second driving electrode 130b are connected to an external power supply (not shown) of the ultrasonic motor 100. As an example, an FPC (flexible print circuit) is used for connection and one end of the FPC is connected to each electrode. Thus, the drive signal is applied to the piezoelectric element 130 for torsional vibration via the first driving electrode 130a and the second driving electrode 130b. Accordingly, depending on an electrical polarity of the signal, the drive signal is applied to the driving electrodes in a direction from the first driving electrode 130a to the second driving electrode 130b or in a direction from the second driving electrode 130b to the first driving electrode 130a.

A polarization direction P1 of the piezoelectric element 130 for torsional vibration is orthogonal to the signal application direction towards the driving electrodes, and that is set in a direction that is orthogonal to a vertical direction of the piezoelectric element 130 for torsional vibration. As described later, because the piezoelectric element 130 for torsional vibration is arranged such that the vertical direction thereof orthogonally matches with the central axis 100c of the rotor 102 (FIGS. 1 and 2), the polarization direction P1 of the piezoelectric element 130 for torsional vibration is orthogonal to the signal application direction towards the driving electrodes and orthogonal to the central axis 100c of the rotor 102.

If the drive signal is applied to the piezoelectric element 130 for torsional vibration having the structure described above, the thickness shear vibration shown in FIGS. 6A and 6B or FIGS. 7A and 7B is generated in the piezoelectric element 130 for torsional vibration. Specifically, as shown in FIGS. 6A and 6B, if a minus side of the external power supply is connected to the first driving electrode 130a and a plus side is connected to the second driving electrode 130b, the front face and the rear face of the piezoelectric element 130 for torsional vibration deform in directions that are parallel to each face but reversed from each other. On the contrary, as shown in FIGS. 7A and 7B, if the plus side of the external power supply is connected to the first driving electrode 130a and the minus side is connected to the second driving electrode 130b, the front face and the rear face of the piezoelectric element 130 for torsional vibration deform in directions opposite to the directions of the case shown in FIGS. 6A and 6B. Thus, the thickness shear vibration can be generated in the piezoelectric element 130 for torsional vibration according to the signal applied to the first driving electrode 130a and the second driving electrode 130b, producing a shearing deformation in the piezoelectric element 130 for torsional vibration.

Figure 8:
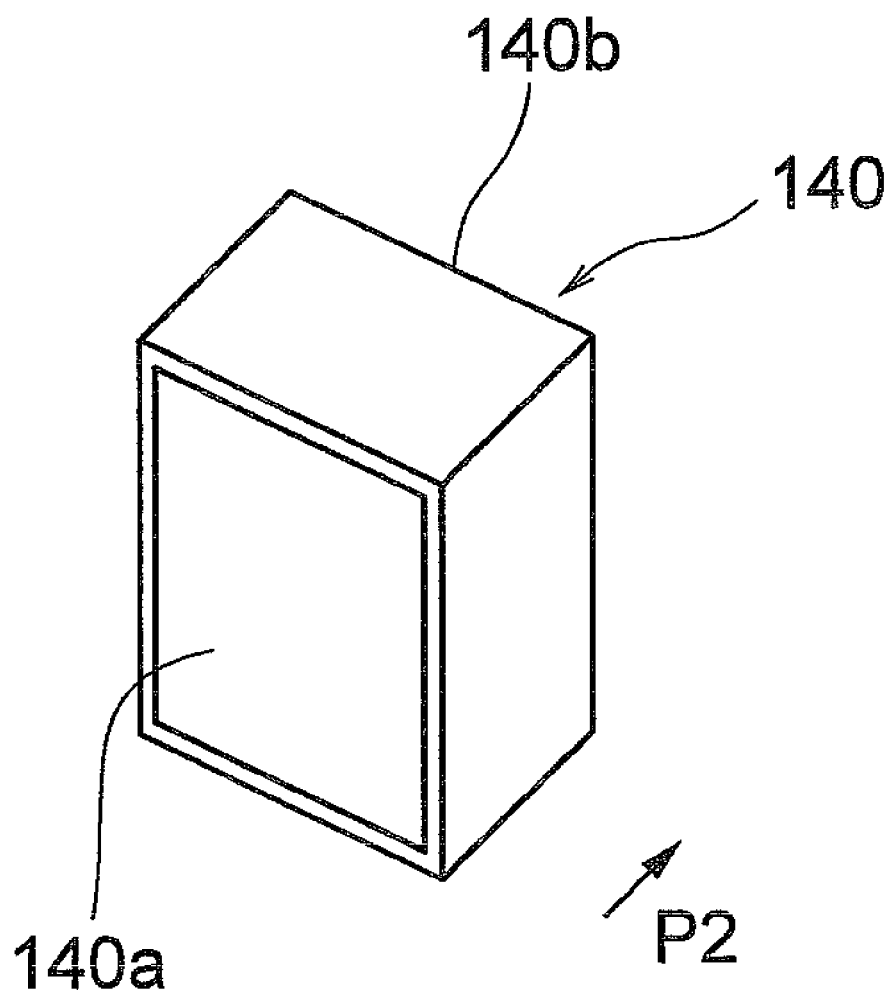
FIG. 8 is a perspective view, from an upper front right side, of a structure of a piezoelectric element for longitudinal vibration according to the first embodiment.
Figure 10A:
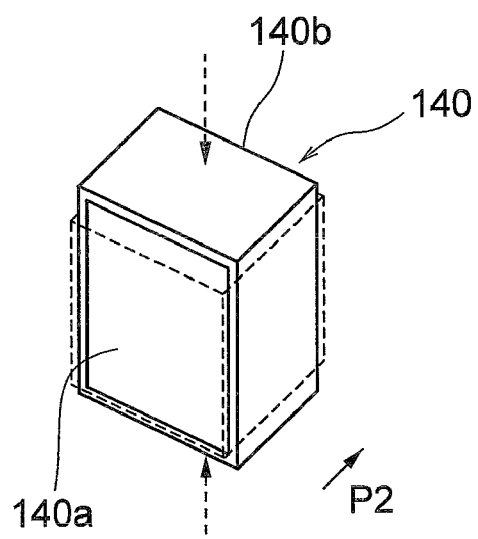
FIG. 10A is a perspective view, from an upper front right side, depicting a longitudinal vibration when the drive signal in a direction opposite to the direction of the case shown in FIGS. 9A and 9B is applied to the piezoelectric element for longitudinal vibration.
Figure 10B:
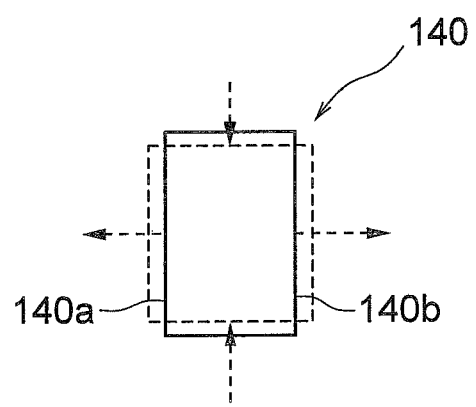
FIG. 10B is a right side view of FIG. 10A.

The piezoelectric element 140 for longitudinal vibration constituting the multilayered piezoelectric element 120 is explained next with reference to FIGS. 8 to 10B. FIG. 8 is a perspective view, from an upper front right side, of a structure of the piezoelectric element 140 for longitudinal vibration. FIG. 9A is a perspective view, from an upper front right side, depicting a vibration when the drive signal is applied to the piezoelectric element 140 for longitudinal vibration. FIG. 9B is a right side view of FIG. 9A. FIG. 10A is a perspective view, from an upper front right side, depicting a longitudinal vibration when the drive signal in a direction opposite to the direction of the case shown in FIGS. 9A and 9B is applied to the piezoelectric element 140 for longitudinal vibration. FIG. 10B is a right side view of FIG. 10A.

As shown in FIG. 8, the piezoelectric element 140 for longitudinal vibration is a piezoelectric body of a substantially right-angled parallelepiped shape. In the piezoelectric element 140 for longitudinal vibration, a first driving electrode 140a and a second driving electrode 140b are, respectively, provided on a front face and a rear face, of the piezoelectric element 140 for longitudinal vibration, that are facing each other. The first driving electrode 140a and the second driving electrode 140b are connected to the external power supply (not shown) of the ultrasonic motor 100. As an example, the FPC is used for connection and one end of the FPC is connected to each electrode. Thus, the drive signal is applied to the piezoelectric element 140 for longitudinal vibration via the first driving electrode 140a and the second driving electrode 140b. Accordingly, depending on an electrical polarity of the signal, the drive signal is applied to the driving electrodes in a direction from the first driving electrode 140a to the second driving electrode 140b or in a direction from the second driving electrode 140b to the first driving electrode 140a.

A polarization direction P2 of the piezoelectric element 140 for longitudinal vibration is a direction along the signal application direction towards the driving electrodes. As described later, because the piezoelectric element 140 for longitudinal vibration is arranged such that a vertical direction thereof orthogonally matches with the central axis 100c of the rotor 102 (FIGS. 1 and 2), the polarization direction P2 of the piezoelectric element 140 for longitudinal vibration is along the signal application direction towards the driving electrodes, and orthogonal to the central axis 100c of the rotor 102.

If the drive signal is applied to the piezoelectric element 140 for longitudinal vibration having the structure described above, the longitudinal vibration is generated in the piezoelectric element 140 for longitudinal vibration as shown in FIGS. 9A and 9B or FIGS. 10A and 10B. Specifically, if one of the minus and plus sides of the external power supply is connected to the first driving electrode 140a and the other side is connected to the second driving electrode 140b, the piezoelectric element 140 for longitudinal vibration expands in a vertical direction (vertical direction shown in FIGS. 8 to 10B) as shown in FIGS. 9A and 9B. If connection to the first driving electrode 140a and the second driving electrode 140b is interchanged, the piezoelectric element 140 for longitudinal vibration contracts in the vertical direction. Thus, the longitudinal vibration can be generated in the piezoelectric element 140 for longitudinal vibration according to the signal applied to the first driving electrode 140a and the second driving electrode 140b.

Figure 11:
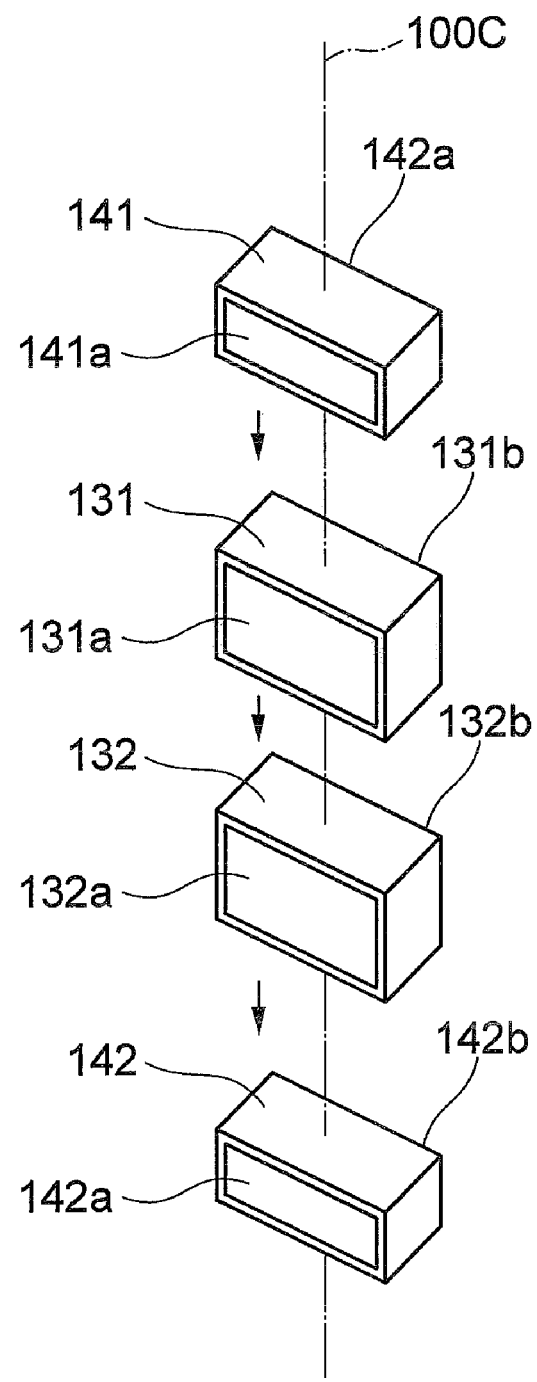
FIG. 11 is an exploded perspective view of a structure of a multilayered piezoelectric element according to the first embodiment.
Figure 12:
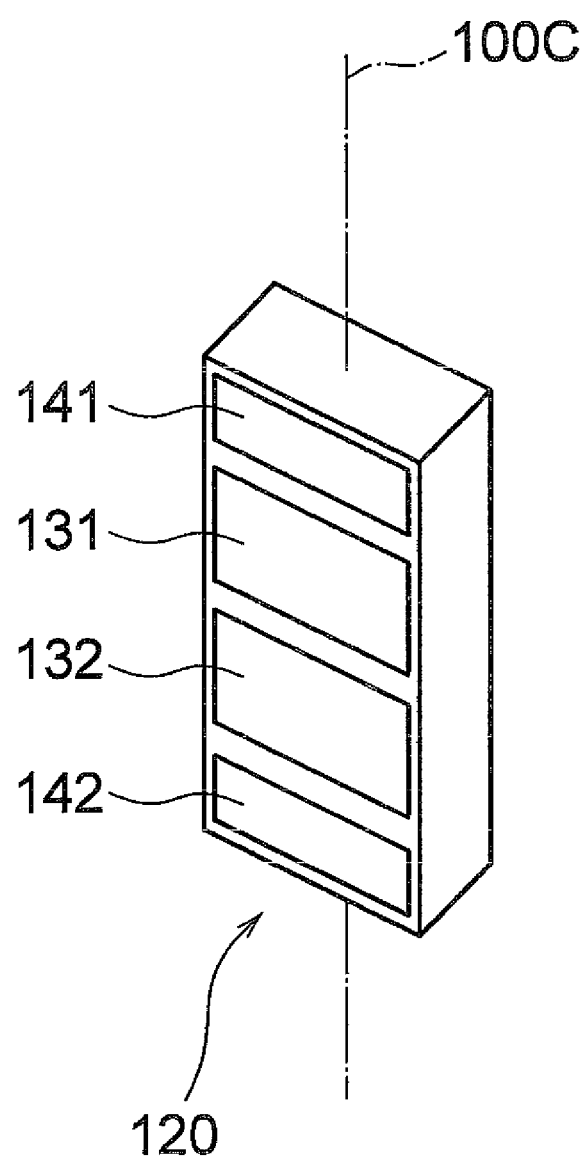
FIG. 12 is a perspective view of the structure of the multilayered piezoelectric element according to the first embodiment.

Generation of the torsional tertiary resonance vibration is explained with reference to FIGS. 11, 12 and 13. The multilayered piezoelectric element 120 includes, stacked from the top along the central axis 100c, the third piezoelectric element 141, the first piezoelectric element 131, the second piezoelectric element 132, and the fourth piezoelectric element 142. FIG. 11 is an exploded perspective view, from an upper front right side, of a structure of the multilayered piezoelectric element 120. FIG. 12 is a perspective view, from an upper front right side, of the multilayered piezoelectric element 120 after stacking the piezoelectric elements.

The first piezoelectric element 131 and the second piezoelectric element 132 have the same structure as that of the piezoelectric element 130 for torsional vibration shown in FIGS. 5 to 7B. The shape of the first piezoelectric element 131 and the second piezoelectric element 132 is also the same. A first driving electrode 131a and a second driving electrode 131b of the first piezoelectric element 131, respectively, correspond to the first driving electrode 130a and the second driving electrode 130b of the piezoelectric element 130 for torsional vibration. A first driving electrode 132a and a second driving electrode 132b of the second piezoelectric element 132, respectively, correspond to the first driving electrode 130a and the second driving electrode 130b of the piezoelectric element 130 for torsional vibration. The first piezoelectric element 131 and the second piezoelectric element 132 are stacked such that the first driving electrode 131a and the first driving electrode 132a are arranged on the front face of the multilayered piezoelectric element 120.

The third piezoelectric element 141 and the fourth piezoelectric element 142 have the same structure as that of the piezoelectric element 140 for longitudinal vibration shown in FIGS. 8 to 10B. The shape of the third piezoelectric element 141 and the fourth piezoelectric element 142 is also the same. A first driving electrode 141a and a second driving electrode 141b of the third piezoelectric element 141, respectively, correspond to the first driving electrode 140a and the second driving electrode 140b of the piezoelectric element 140 for longitudinal vibration. A first driving electrode 142a and a second driving electrode 142b of the fourth piezoelectric element 142, respectively, correspond to the first driving electrode 140a and the second driving electrode 140b of the piezoelectric element 140 for longitudinal vibration. The third piezoelectric element 141 and the fourth piezoelectric element 142 are stacked such that the first driving electrode 141a and the first driving electrode 142a are arranged on the front face of the multilayered piezoelectric element 120.

Figure 13:
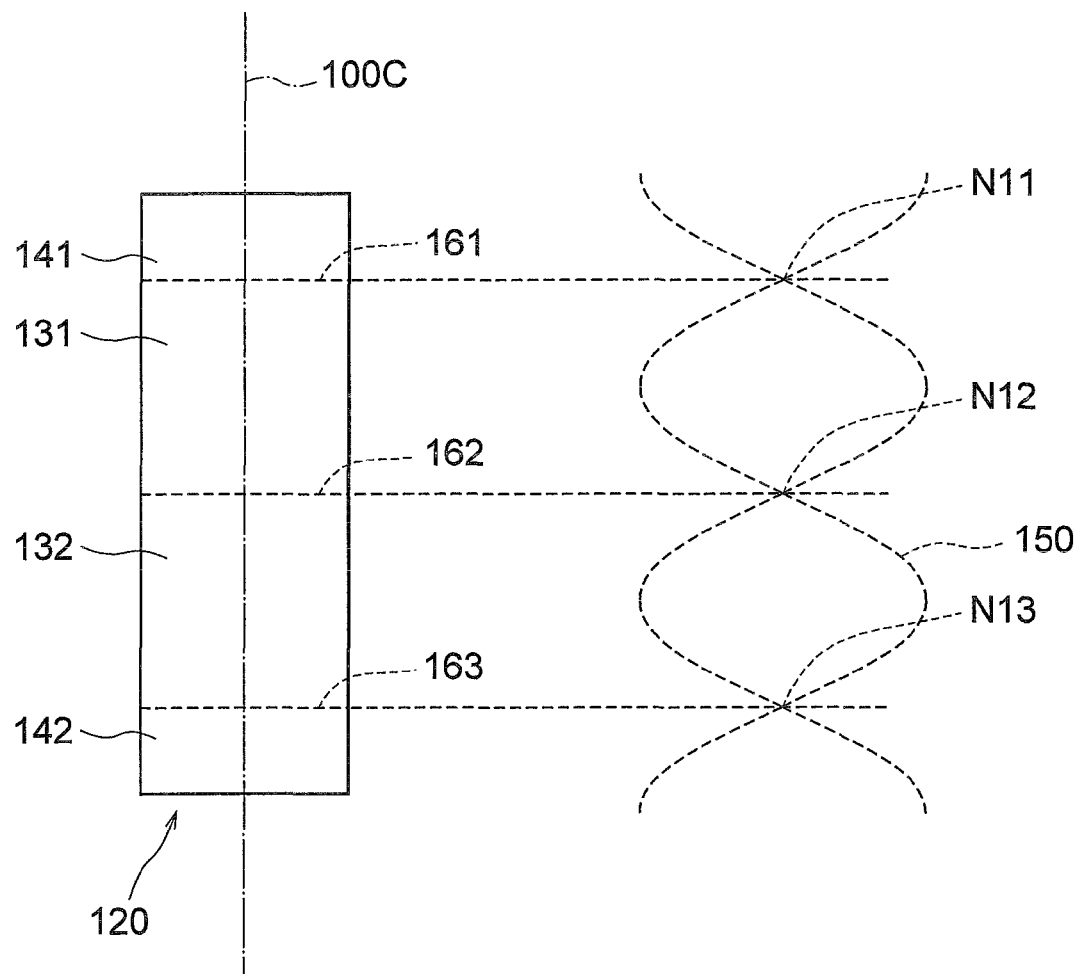
FIG. 13 is a side view of the structure of the multilayered piezoelectric element after stacking piezoelectric elements, and depicts a side view of a vibration state of the vibrator in the torsional tertiary resonance vibration mode shown in FIG. 3E.

FIG. 13 is a side view of the structure of the multilayered piezoelectric element 120 after stacking the piezoelectric elements, and depicts a side view of a vibration state of the vibrator 101 in the torsional tertiary resonance vibration mode shown in FIG. 3E.

The concept behind the structure of the multilayered piezoelectric element 120 described so far is described below. In the multilayered piezoelectric element 120 shown on the left side in FIG. 13, a short side and a long side are configured so as to satisfy conditions that generate the torsional tertiary resonance vibration, as shown in FIG. 4. As a result, the torsional tertiary resonance vibration, shown on the right side in FIG. 13, is generated. A wavy line 150 indicates the vibration state of the torsional tertiary resonance vibration that is shown on the right side in FIG. 13. The piezoelectric elements are arranged such that they correspond to positions of nodes and anti-nodes of the vibration state indicated by the wavy line 150.

Specifically, as shown in FIG. 13, a boundary surface 161 is provided between the first piezoelectric element 131 and the third piezoelectric element 141 so as to correspond to a node N11, a boundary surface 162 is provided between the first piezoelectric element 131 and the second piezoelectric element 132 so as to correspond to a node N12, and a boundary surface 163 is provided between the second piezoelectric element 132 and the fourth piezoelectric element 142 so as to correspond to a node N13. In other words, the boundary surfaces are provided between the piezoelectric elements so as to correspond to the node positions of the torsional tertiary resonance vibration 150. Furthermore, side faces of the first piezoelectric element 131 and the second piezoelectric element 132 are arranged so as to correspond, respectively, to two anti-nodes of the torsional tertiary resonance vibration 150.

Due to the structure described above, a torsional stress is maximum at the torsional node positions, thus efficiently exciting the torsional tertiary resonance vibration.

Drive signals of reverse phases are, respectively, applied to the first piezoelectric element 131 and the second piezoelectric element 132 so that the signal application direction will be reversed. Due to this, the torsional tertiary resonance vibration (FIG. 3E) resulting from twisting of the vibrator 101 about the central axis 100c is generated. Moreover, an elliptical vibration is generated on both end faces in the height direction of the vibrator 101 by combining the torsional tertiary resonance vibration and the longitudinal primary resonance vibration (FIG. 3C) generated due to deformation of the third piezoelectric element 141 and the fourth piezoelectric element 142. Accordingly, the elliptical vibration is propagated to the rotor 102 through the friction contact members 103a and 103b.

With the structure described above, the vibrator 101 that consists of a single member of a simple structure without a groove, etc., can be obtained. The cost of the ultrasonic motor 100 that includes this vibrator 101 can be reduced because it requires only a small number of parts and can be easily assembled. Furthermore, the ultrasonic motor 100 can easily generate the longitudinal vibration and the torsional vibration, and rotate the rotor 102 using the elliptical vibration that is formed by combining the longitudinal vibration and the torsional vibration.

Second Embodiment

In an ultrasonic motor according to a second embodiment, a structure of a multilayered piezoelectric element 220 used in the vibrator 101 differs from that of the multilayered piezoelectric element 120 according to the first embodiment. A structure of the ultrasonic motor according to the second embodiment is the same as that of the ultrasonic motor 100 according to the first embodiment except the multilayered piezoelectric element 220. Identical reference symbols are used for identical members and description of the members other than the multilayered piezoelectric element 220 is emitted.

Figure 14:
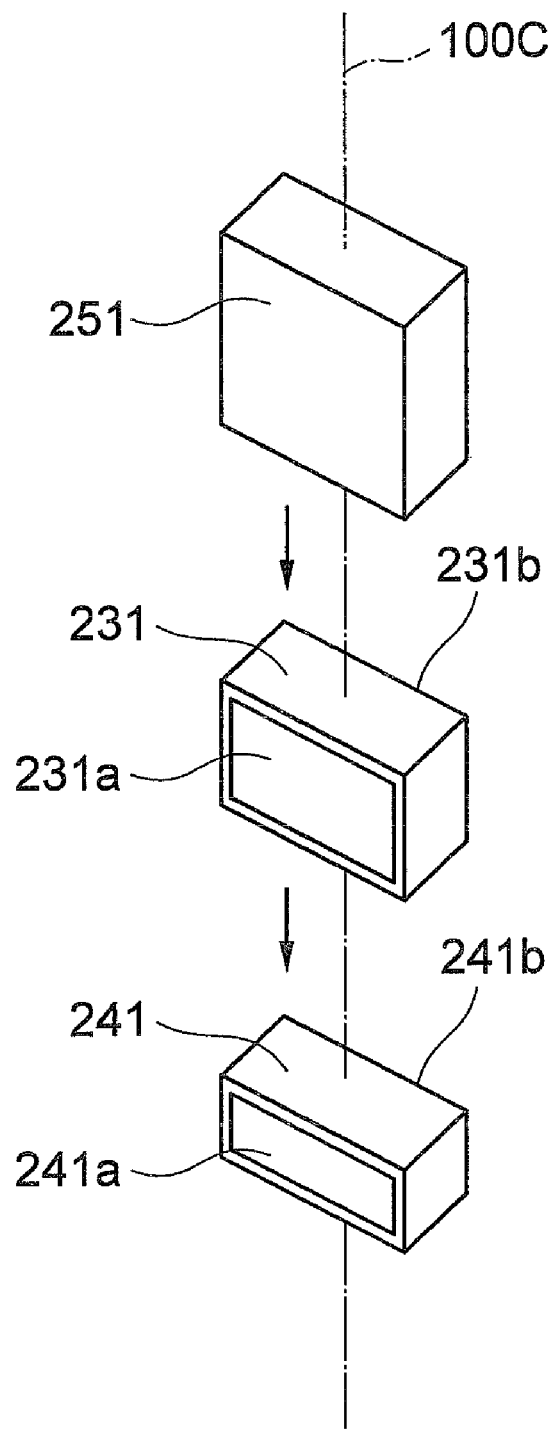
FIG. 14 is an exploded perspective view of a structure of a multilayered piezoelectric element according to a second embodiment of the present invention.
Figure 15:
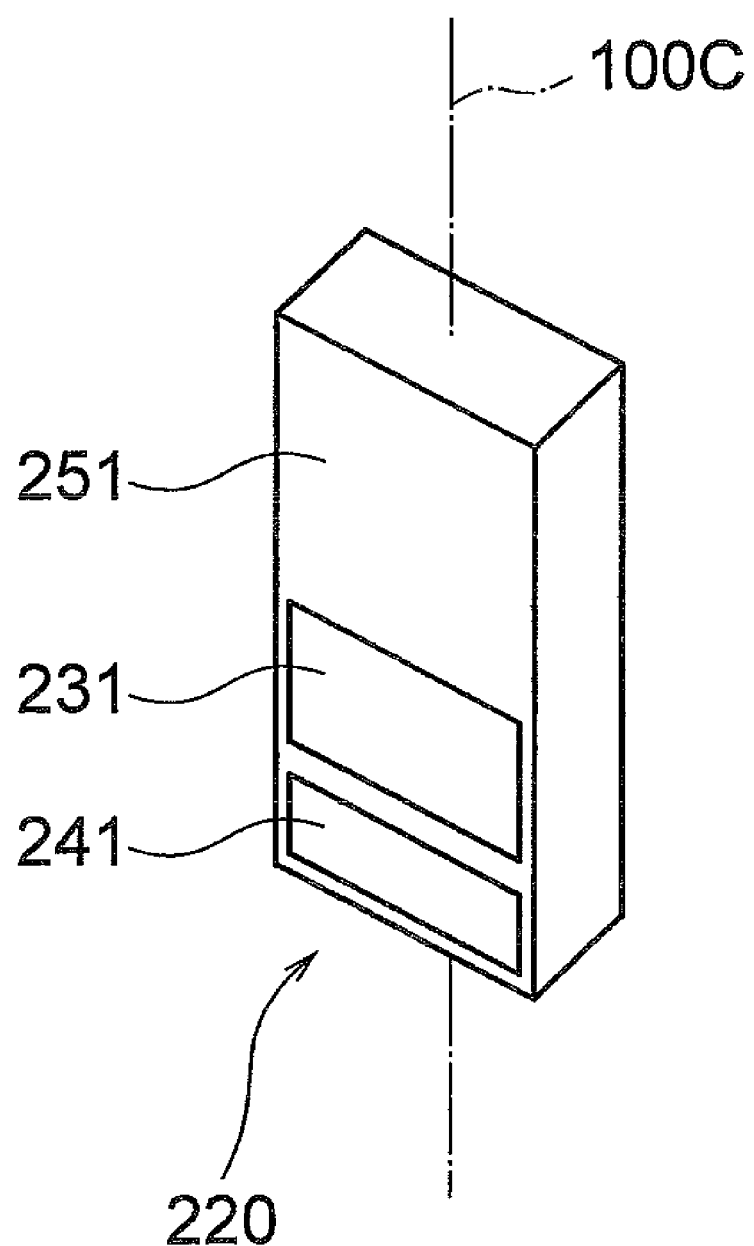
FIG. 15 is a perspective view of the structure of the multi-layered piezoelectric element according to the second embodiment.

FIG. 14 is an exploded perspective view, from an upper front right side, of the structure of the multilayered piezoelectric element 220. FIG. 15 is a perspective view, from an upper front right side, of the structure of the multilayered piezoelectric element 220 after stacking the piezoelectric elements.

As shown in FIGS. 14 and 15, the multilayered piezoelectric element 220 includes, stacked from the top along the central axis 100c, a third element 251, a first piezoelectric element 231, and a second piezoelectric element 241.

The third element 251 is an element that does not include driving electrodes. For example, the third element 251 uses ceramic that is not subjected to a polarization process.

The first piezoelectric element 231 has the same structure as that of the piezoelectric element 130 for torsional vibration shown in FIGS. 5 to 7B. A first driving electrode 231a and a second driving electrode 231b of the first piezoelectric element 231, respectively, correspond to the first driving electrode 130a and the second driving electrode 130b of the piezoelectric element 130 for torsional vibration. The first piezoelectric element 231 is stacked such that the first driving electrode 231a is arranged on a front face of the multilayered piezoelectric element 220.

The second piezoelectric element 241 has the same structure as that of the piezoelectric element 140 for longitudinal vibration shown in FIGS. 8 to 10B. A first driving electrode 241a and a second driving electrode 241b of the second piezoelectric element 241, respectively, correspond to the first driving electrode 140a and the second driving electrode 140b of the piezoelectric element 140 for longitudinal vibration. The second piezoelectric element 241 is stacked such that the first driving electrode 241a is arranged on the front face of the multilayered piezoelectric element 220.

Figure 16:
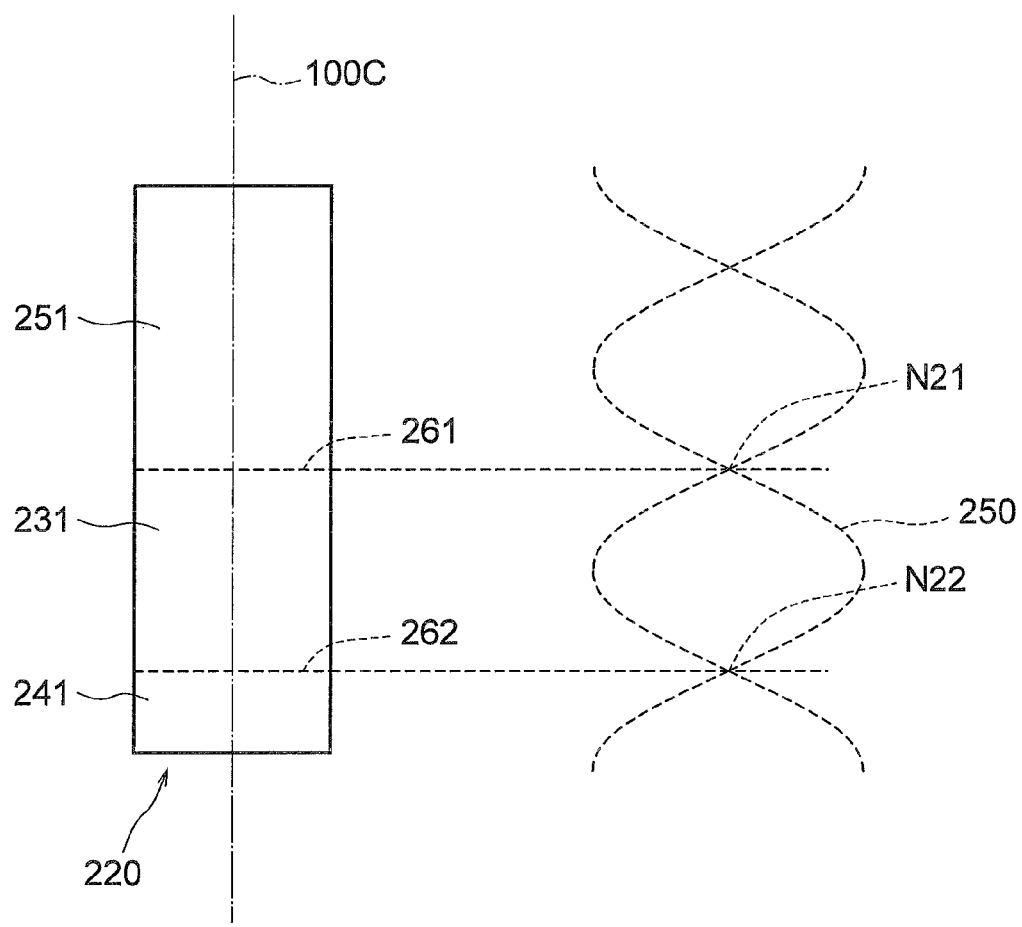
FIG. 16 is a side view of the structure of the multilayered piezoelectric element after stacking piezoelectric elements, and depicts a side view of a vibration state of the vibrator in the torsional tertiary resonance vibration mode shown in FIG. 3E.

FIG. 16 is a side view of the structure of the multilayered piezoelectric element 220 after stacking the piezoelectric elements, and depicts a side view of a vibration state of the vibrator 101 in the torsional tertiary resonance vibration mode shown in FIG. 3E.

The concept behind the structure of the multilayered piezoelectric element 220 described so far is described below. In the multilayered piezoelectric element 220 shown on the left side in FIG. 16, a short side and a long side are configured so as to satisfy conditions that generate the torsional tertiary resonance vibration, as shown in FIG. 4. As a result, the torsional tertiary resonance vibration, shown on the right side in FIG. 16, is generated. A wavy line 250 indicates the vibration state of the torsional tertiary resonance vibration shown on the right side in FIG. 16. The piezoelectric elements are arranged such that they correspond to positions of nodes and anti-nodes of the vibration state indicated by the wavy line 250.

Specifically, as shown in FIG. 16, a boundary surface 261 is provided between the third element 251 and the first piezoelectric element 231 so as to correspond to a node N21, a boundary surface 262 is provided between the first piezoelectric element 231 and the second piezoelectric element 241 so as to correspond to a node N22. In other words, the boundary surfaces are provided between the elements so as to correspond to the node positions of the torsional tertiary resonance vibration 250. Furthermore, side faces of the first piezoelectric element 231 are arranged so as to correspond to an anti-node of the torsional tertiary resonance vibration 250.

Due to the structure described above, a torsional stress is maximum at the torsional node positions, thus efficiently exciting the torsional tertiary resonance vibration.

In the ultrasonic motor 100 according to the first embodiment, the boundary surfaces are provided above and below the two piezoelectric elements 131 and 132 for torsional vibration so as to correspond to the node positions of the torsional tertiary resonance vibration, while in the ultrasonic motor according to the second embodiment, the boundary surfaces are provided above and below one piezoelectric element 231 for torsional vibration so as to correspond to the node positions of the torsional tertiary resonance vibration. The torsional tertiary resonance vibration similar to that of the first embodiment can be generated even if there is one piezoelectric element for torsional vibration in which the nodes of the torsional tertiary resonance vibration are arranged as described above.

If the drive signal is applied to the first piezoelectric element 231, the torsional tertiary resonance vibration resulting from twisting of the vibrator 101 about the central axis 100c is generated (FIG. 3E). Furthermore, the elliptical vibration is generated on both the end faces in the height direction of the vibrator 101 by combining the torsional tertiary resonance vibration and the longitudinal primary resonance vibration generated due to deformation of the second piezoelectric element 241 (FIG. 3C). The third element 251 also vibrates in response to the generated resonance vibrations. Thus, the elliptical vibration is propagated to the rotor 102 through the friction contact members 103a and 103b.

Furthermore, other structures, operations, and advantages are the same as those of the first embodiment.

Third Embodiment

In an ultrasonic motor according to a third embodiment, a structure of a multilayered piezoelectric element 320 used in the vibrator 101 differs from that of the multilayered piezoelectric element 120 according to the first embodiment, and a generated torsional resonance vibration is a torsional secondary resonance vibration. A structure of the ultrasonic motor according to the third embodiment is the same as that of the ultrasonic motor 100 according to the first embodiment except the multilayered piezoelectric element 320. Identical reference symbols are used for identical members and description of the members other than the multilayered piezoelectric element 320 is omitted.

Figure 17:
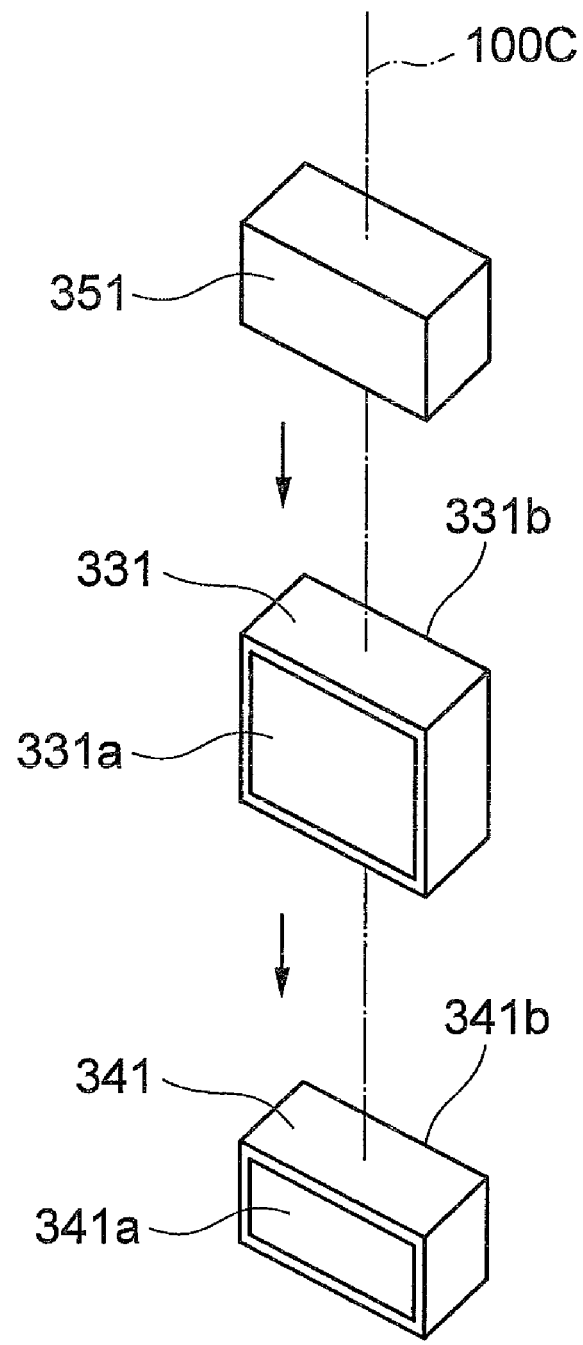
FIG. 17 is an exploded perspective view of a structure of a multilayered piezoelectric element according to a third embodiment of the present invention.
Figure 18:
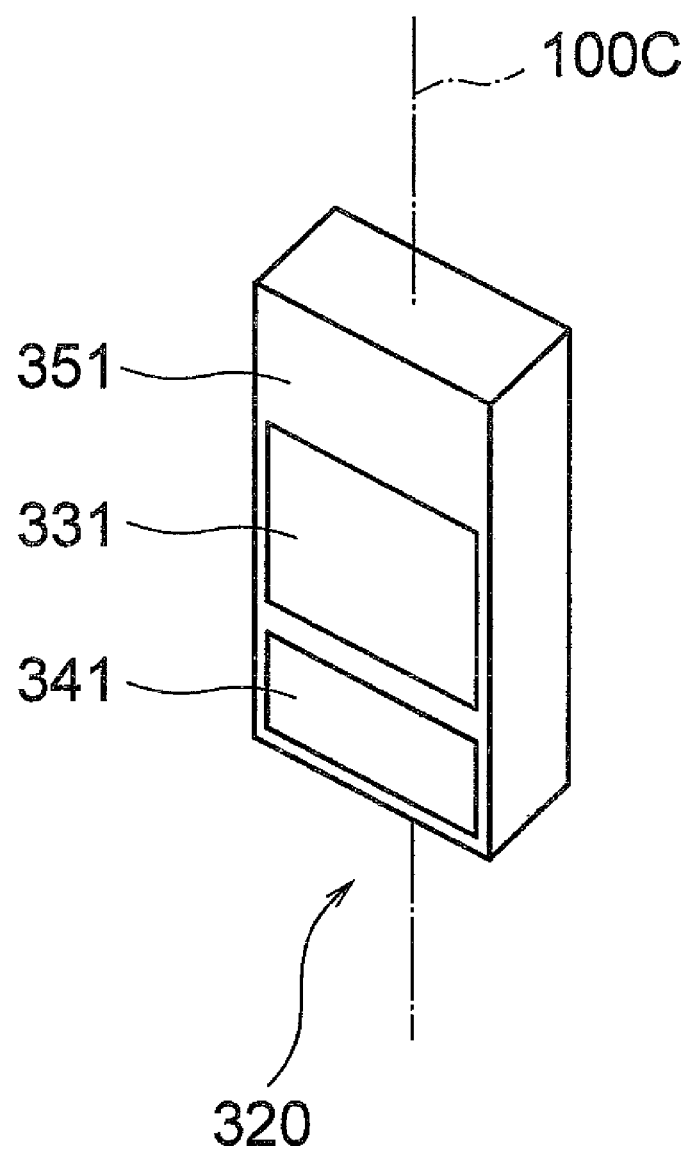
FIG. 18 is a perspective view of the structure of the multi-layered piezoelectric element according to the third embodiment.

FIG. 17 is an exploded perspective view, from an upper front right side, of the structure of the multilayered piezoelectric element 320. FIG. 18 is a perspective view, from an upper front right side, of the structure of the multilayered piezoelectric element 320 after stacking the piezoelectric elements.

As shown in FIGS. 17 and 18, the multilayered piezoelectric element 320 includes, stacked from the top along the central axis 100c, a third element 351, a first piezoelectric element 331, and a second piezoelectric element 341.

The third element 351 is an element that does not include driving electrodes. For example, the third element 351 uses ceramic that is not subjected to a polarization process.

The first piezoelectric element 331 has the same structure as that of the piezoelectric element 130 for torsional vibration shown in FIGS. 5 to 7B. A first driving electrode 331a and a second driving electrode 331b of the first piezoelectric element 331, respectively, correspond to the first driving electrode 130a and the second driving electrode 130b of the piezoelectric element 130 for torsional vibration. The first piezoelectric element 331 is stacked such that the first driving electrode 331a is arranged on a front face of the multilayered piezoelectric element 320.

The second piezoelectric element 341 has the same structure as that of the piezoelectric element 140 for longitudinal vibration shown in FIGS. 8 to 10B. A first driving electrode 341a and a second driving electrode 341b of the second piezoelectric element 341, respectively, correspond to the first driving electrode 140a and the second driving electrode 140b of the piezoelectric element 140 for longitudinal vibration. The second piezoelectric element 341 is stacked such that the first driving electrode 341a is arranged on the front face of the multilayered piezoelectric element 320.

Figure 19:
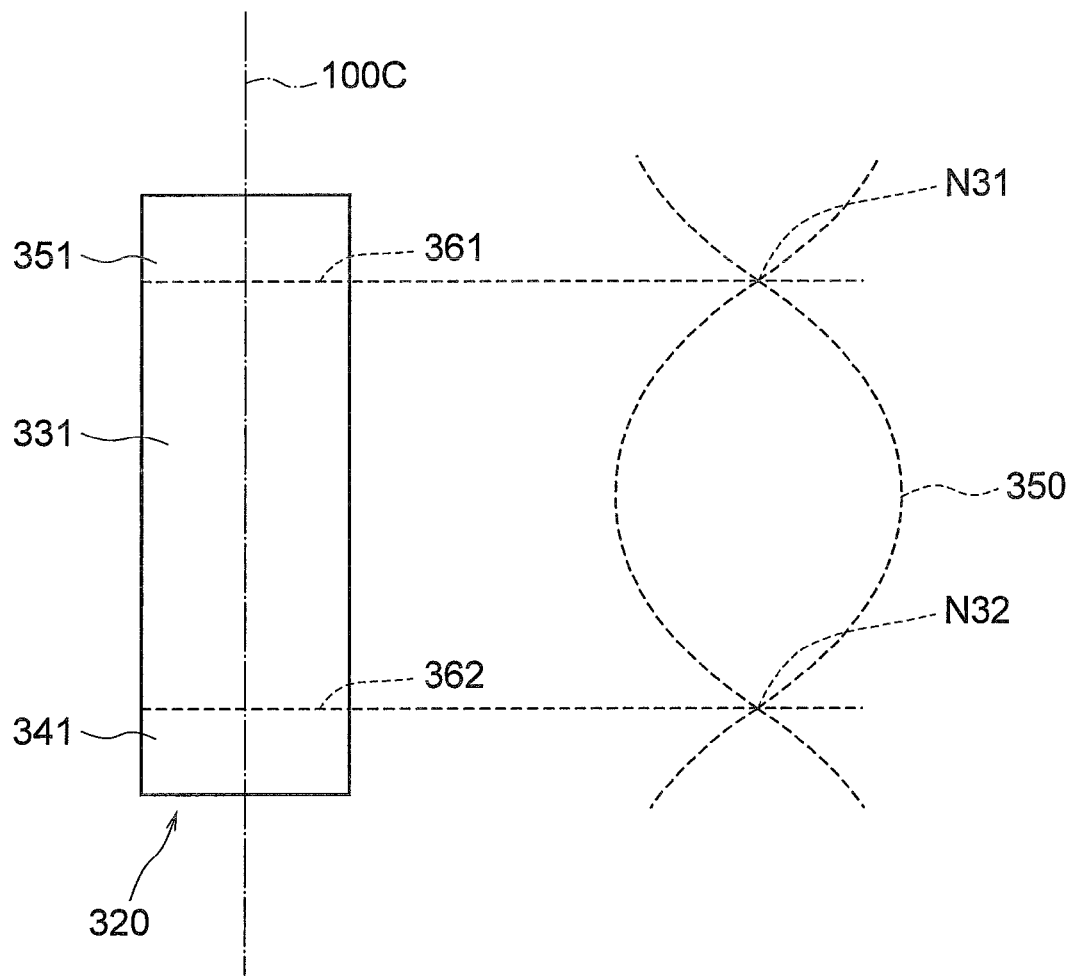
FIG. 19 is a side view of the structure of the multilayered piezoelectric element after stacking piezoelectric elements, and depicts a side view of a vibration state of the vibrator in the torsional secondary resonance vibration mode shown in FIG. 3D.

FIG. 19 is a side view of the structure of the multilayered piezoelectric element 320 after stacking the piezoelectric elements, and depicts a side view of a vibration state of the vibrator 101 in the torsional secondary resonance vibration mode shown in FIG. 3D.

The concept behind the structure of the multilayered piezoelectric element 320 described so far is described below. In the multilayered piezoelectric element 320 shown on the left side in FIG. 19, a short side and a long side are configured so as to satisfy conditions that generate the torsional secondary resonance vibration, as shown in FIG. 4. As a result, the torsional secondary resonance vibration, shown on the right side in FIG. 19, is generated. A wavy line 350 indicates the vibration state of the torsional secondary resonance vibration shown on the right side in FIG. 19. The piezoelectric elements are arranged such that they correspond to positions of nodes and anti-nodes of the vibration state indicated by the wavy line 350.

Specifically, as shown in FIG. 19, a boundary surface 361 is provided between the third element 351 and the first piezoelectric element 331 so as to correspond to a node N31, and a boundary surface 362 is provided between the first piezoelectric element 331 and the second piezoelectric element 341 so as to correspond to a node N32. In other words, the boundary surfaces are provided between the elements so as to correspond to the node positions of the torsional secondary resonance vibration 350. Furthermore, side faces of the first piezoelectric element 331 are arranged so as to correspond to an anti-node of the torsional secondary resonance vibration 350.

Due to the structure described above, a torsional stress is maximum at the torsional node positions, thus efficiently exciting the torsional secondary resonance vibration.

In the ultrasonic motor 100 according to the first embodiment, the boundary surfaces are provided above and below the two piezoelectric elements 131 and 132 for torsional vibration so as to correspond to the node positions of the torsional tertiary resonance vibration, while in the ultrasonic motor according to the third embodiment, the boundary surfaces are provided above and below one piezoelectric element 331 for torsional vibration so as to correspond to the node positions of the torsional secondary resonance vibration. The torsional secondary resonance vibration similar to that of the first embodiment can be generated even if there is one piezoelectric element for torsional vibration in which the nodes of the torsional secondary resonance vibration are arranged as described above.

If the drive signal is applied to the first piezoelectric element 331, the torsional secondary resonance vibration resulting from twisting of the vibrator 101 about the central axis 100c is generated (FIG. 3D). Furthermore, the elliptical vibration is generated on both the end faces in the height direction of the vibrator 101 by combining the torsional secondary resonance vibration and the longitudinal primary resonance vibration generated due to deformation of the second piezoelectric element 341 (FIG. 3C). The third element 351 also vibrates in response to the generated resonance vibrations. Thus, the elliptical vibration is propagated to the rotor 102 through the friction contact members 103a and 103b.

Furthermore, other structures, operations, and advantages are the same as those of the first embodiment.

As explained above, the ultrasonic motor according to the present invention is appropriate for the ultrasonic motor that rotates the rotor by generating the elliptical vibration by combining the longitudinal vibration and the torsional vibration.

The ultrasonic motor according to the present invention can generate the torsional resonance vibration efficiently by positively applying the bending movement of the piezoelectric element. Moreover, the ultrasonic motor according to the present invention consists of a single part, has a simple structure without a groove etc., can generate the longitudinal vibration and the torsional vibration easily, can generate the elliptical vibration by combining the longitudinal vibration and the torsional vibration, and can rotate the rotor by the elliptical vibration.

What is claimed is:

1. An ultrasonic motor at least comprising:
a vibrator having a dimension ratio of a rectangle in a cross-section orthogonal to a central axis; and
a rotor that is in contact with an elliptical vibration generating surface of the vibrator and that is rotated about the central axis that is orthogonal to the elliptical vibration generating surface of the vibrator, wherein
an elliptical vibration is generated by combining a longitudinal primary resonance vibration resulting from an expansion and a contraction of the vibrator in a direction of the central axis and a torsional secondary resonance vibration or a torsional tertiary resonance vibration resulting from twisting of a rotation axis,
the dimension ratio of the rectangle of the vibrator is chosen such that a resonance frequency of the longitudinal primary resonance vibration resulting from the expansion and the contraction of the vibrator in the direction of the central axis and a resonance frequency of the torsional secondary resonance vibration or the torsional tertiary resonance vibration resulting from twisting of the rotation axis match, and
the vibrator includes a torsional piezoelectric body that generates a thickness shear vibration, and that is arranged at an anti-node position of the torsional secondary resonance vibration or the torsional tertiary resonance vibration.

2. The ultrasonic motor according to claim 1, wherein a polarization direction of the torsional piezoelectric body is orthogonal to the rotation axis of the rotor and an application direction towards driving electrodes.

3. The ultrasonic motor according to claim 2, wherein two torsional piezoelectric bodies are arranged at two anti-node positions of the torsional tertiary resonance vibration.

4. The ultrasonic motor according to claim 2, wherein one torsional piezoelectric body is arranged at one of two anti-node positions of the torsional tertiary resonance vibration.

5. The ultrasonic motor according to claim 2, wherein one torsional piezoelectric body is arranged at one anti-node position of the torsional secondary resonance vibration.

6. The ultrasonic motor according to claim 1, wherein driving electrodes of the torsional piezoelectric body are provided on side faces of the vibrator.

7. The ultrasonic motor according to claim 6, wherein two torsional piezoelectric bodies are arranged at two anti-node positions of the torsional tertiary resonance vibration.

8. The ultrasonic motor according to claim 6, wherein one torsional piezoelectric body is arranged at one of two anti-node positions of the torsional tertiary resonance vibration.

9. The ultrasonic motor according to claim 6, wherein one torsional piezoelectric body is arranged at one anti-node position of the torsional secondary resonance vibration.

10. The ultrasonic motor according to claim 1, wherein two torsional piezoelectric bodies are arranged at two anti-node positions of the torsional tertiary resonance vibration.

11. The ultrasonic motor according to claim 1, wherein one torsional piezoelectric body is arranged at one of two anti-node positions of the torsional tertiary resonance vibration.

12. The ultrasonic motor according to claim 1, wherein one torsional piezoelectric body is arranged at one anti-node position of the torsional secondary resonance vibration.

* * * * *